US012779551B2

(12) United States Patent
Hasegawa

(10) Patent No.: US 12,779,551 B2
(45) Date of Patent: Nov. 3, 2026

(54) INSERT AND CUTTING TOOL

(71) Applicant: KYOCERA CORPORATION, Kyoto (JP)

(72) Inventor: Mitsuru Hasegawa, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 759 days.

(21) Appl. No.: 18/251,399

(22) PCT Filed: Oct. 28, 2021

(86) PCT No.: PCT/JP2021/039812
§ 371 (c)(1),
(2) Date: Nov. 16, 2023

(87) PCT Pub. No.: WO2022/097565
PCT Pub. Date: May 12, 2022

(65) Prior Publication Data
US 2024/0066606 A1 Feb. 29, 2024

(30) Foreign Application Priority Data
Nov. 9, 2020 (JP) ................................ 2020-186483

(51) Int. Cl.
*B23B 27/16* (2006.01)
*B23B 27/10* (2006.01)

(52) U.S. Cl.
CPC .......... *B23B 27/1611* (2013.01); *B23B 27/10* (2013.01); *B23B 2200/0471* (2013.01)

(58) Field of Classification Search
CPC ................ B23B 27/1611; B23B 27/10; B23B 2200/0471; B23B 2200/321; B23B 27/143; B23B 2200/325
See application file for complete search history.

(56) References Cited

U.S. PATENT DOCUMENTS 5,192,171 A * 3/1993 Ther .................... B23B 27/143 D15/139
5,372,463 A 12/1994 Takahashi et al.
(Continued)

FOREIGN PATENT DOCUMENTS

JP H586405 U 11/1993
JP H9174310 A 7/1997
(Continued)

*Primary Examiner* — Sarang Afzali
*Assistant Examiner* — Darrell C Ford
(74) *Attorney, Agent, or Firm* — HAUPTMAN HAM, LLP

(57) ABSTRACT

An insert may include a first surface, a second surface, a third surface located on a side opposite to the first surface, a cutting edge located on a ridgeline between the first surface and the second surface, and a convex part located more inside the first surface than the cutting edge. The first surface may include a groove extending from a first end part closest to the cutting edge to a second end part. The groove may include an opening located in the first surface, and a bottom surface. An imaginary plane which is orthogonal to a central axis and is located between the first surface and the third surface may be a reference plane, the bottom surface may include an inclined portion inclined so as to come closer to the reference plane as going toward the first end part in a breaker region.

13 Claims, 13 Drawing Sheets

(56) References Cited

U.S. PATENT DOCUMENTS

| | | | | | |
|---|---|---|---|---|---|
| 5,695,303 | A * | 12/1997 | Boianjiu | B23B 27/141 | 407/115 |
| 6,447,218 | B1 | 9/2002 | Lagerberg | | |
| 7,387,474 | B2 * | 6/2008 | Edler | B23B 27/1611 | 407/103 |
| 8,454,274 | B2 * | 6/2013 | Chen | B23B 27/10 | 407/113 |
| 10,252,342 | B2 * | 4/2019 | Yamaguchi | B23B 27/143 | |
| 2008/0219784 | A1 * | 9/2008 | Yamazaki | B23B 27/143 | 407/114 |
| 2011/0070040 | A1 * | 3/2011 | Park | B23B 27/143 | 407/113 |
| 2011/0164934 | A1 * | 7/2011 | Chen | B23B 27/143 | 407/116 |
| 2015/0283617 | A1 * | 10/2015 | Nagarajan | B23B 27/143 | 407/114 |
| 2016/0236281 | A1 * | 8/2016 | Kitagawa | B23B 27/10 | |
| 2018/0345383 | A1 * | 12/2018 | Ikeda | B23B 27/1611 | |
| 2022/0126375 | A1 | 4/2022 | Hasegawa | | |

FOREIGN PATENT DOCUMENTS

| | | | |
|---|---|---|---|
| JP | 4275856 | B2 | 6/2009 |
| JP | 5843102 | B2 | 1/2016 |
| JP | 2016132054 | A | 7/2016 |
| WO | 2020184667 | A1 | 9/2020 |

* cited by examiner

INSERT AND CUTTING TOOL

CROSS-REFERENCE TO RELATED APPLICATION

This application is a national stage entry according to 35 U.S.C. 371 of PCT Application No. PCT/JP2021/039812 filed on Oct. 28, 2021, which claims priority to Japanese Patent Application No. 2020-186483, filed Nov. 9, 2020. The contents of this application are incorporated herein by reference in their entirety.

TECHNICAL FIELD

The present disclosure may relate to an insert and a cutting tool.

BACKGROUND

Cemented carbide, cermet, and ceramics are materials excellent in heat resistance and wear resistance, and are therefore used as an insert for a cutting tool. The insert is brought into contact with a workpiece at high speeds during use, and the insert is therefore subjected to a temperature rise.

For that reason, the insert and the workpiece are cooled with a coolant during a machining process. In order to enhance cooling effect thus obtained, a plurality of grooves that serve as a flow path for the coolant are provided on a rake surface of the insert in Japanese Patent No. 5843102 (Patent Document 1). A groove provided on an upper surface has a certain groove depth in Japanese Patent No. 4275856 (Patent Document 2).

SUMMARY

An insert of the present disclosure may include a first surface, a second surface connecting to the first surface, a third surface located on a side opposite to the first surface, a cutting edge located on at least a part of a ridgeline between the first surface and the second surface, and a convex part located more inside the first surface than the cutting edge. The first surface may include, at a position which is located away from the ridgeline and is overlapped with convex part, a groove extending from a first end part closest to the cutting edge to a second end part farthest away from the cutting edge. The groove may include an opening located in the first surface, and a bottom surface. If a range from an apex part of the convex part to the first end part in the first surface may be a breaker region, an imaginary straight line passing through a center of the first surface and a center of the third surface may be a central axis, and an imaginary plane which is orthogonal to the central axis and is located between the first surface and the third surface may be a reference plane, the bottom surface may include an inclined portion inclined so as to come closer to the reference plane as going toward the first end part in the breaker region.

A cutting tool of the present disclosure may include a holder, which has a length extending from a first end to a second end and includes a pocket located on a side of the first end, and the insert located in the pocket.

EMBODIMENTS

Figure 1:
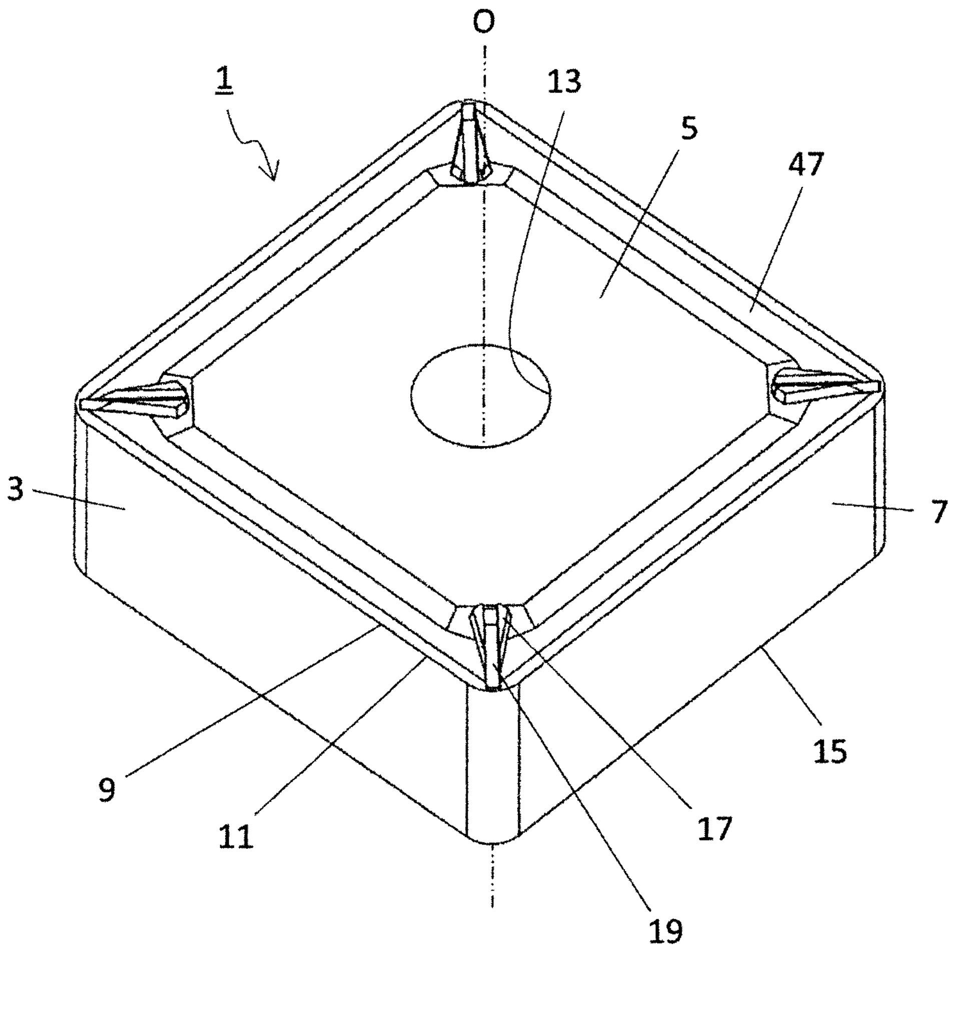
FIG. 1 is a perspective view illustrating an embodiment of inserts in the present disclosure.
Figure 2:
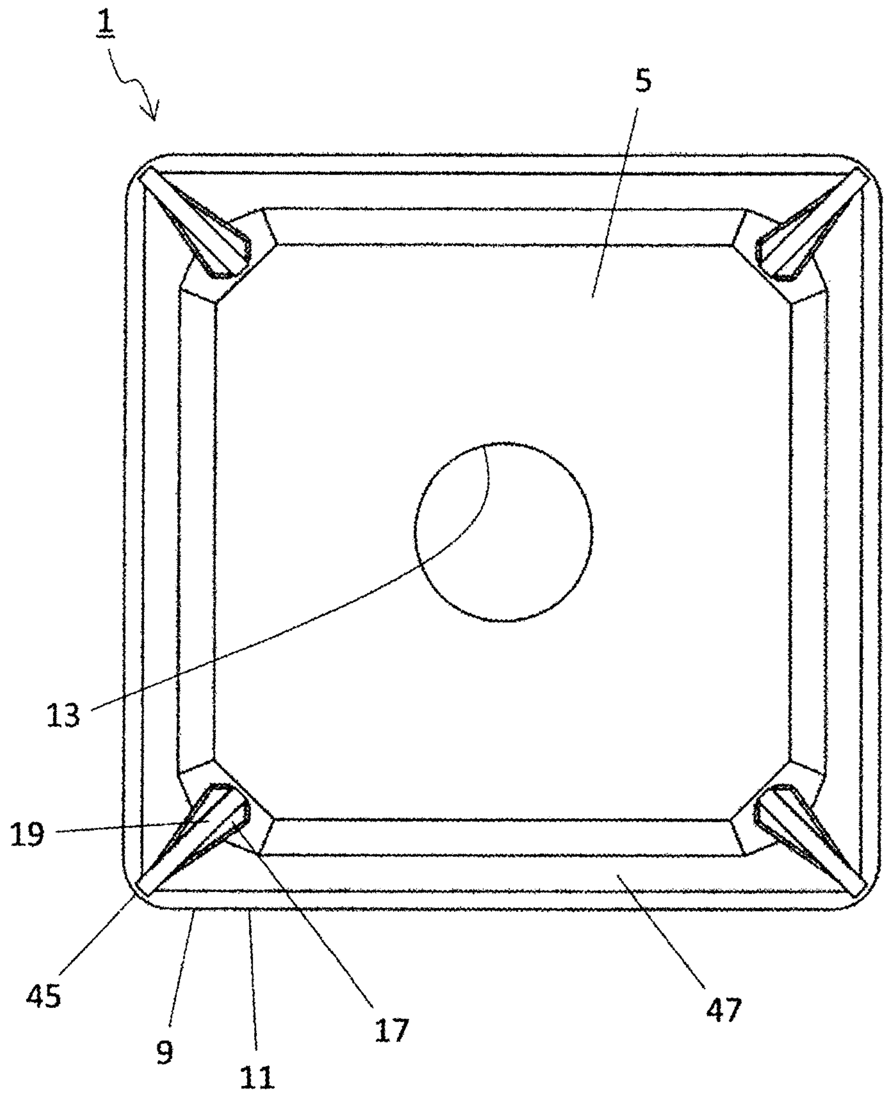
FIG. 2 is a plan view of the insert illustrated in FIG. 1.
Figure 3:
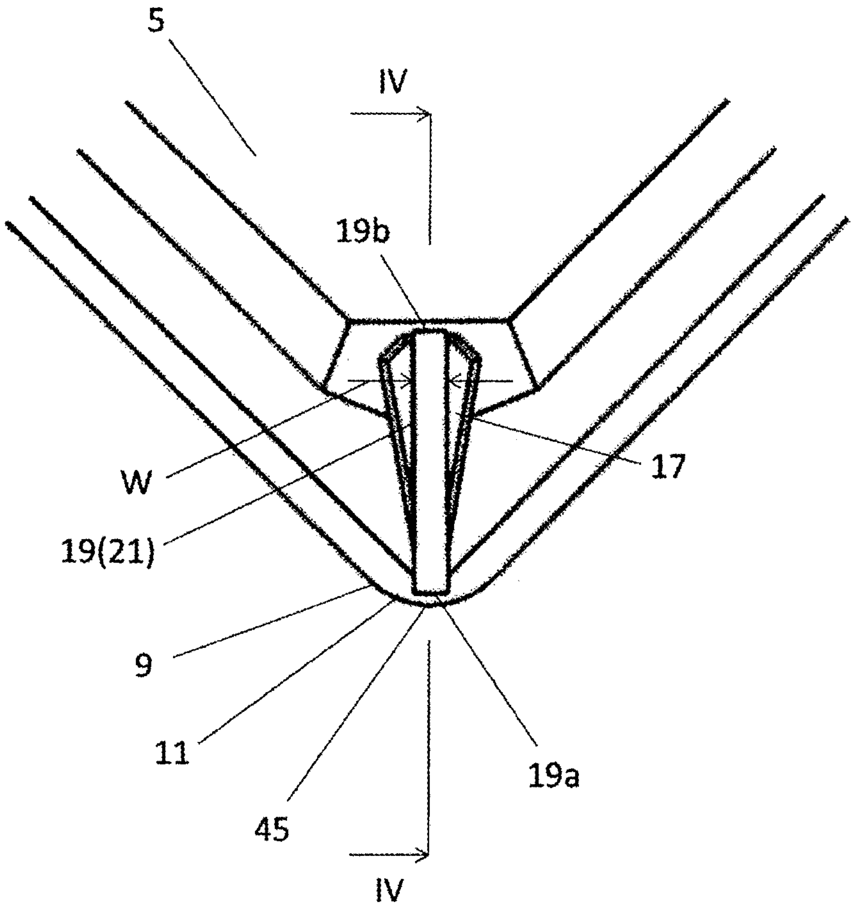
FIG. 3 is an enlarged view of a neighborhood of a corner part in the insert illustrated in FIG. 2.

A related art insert may lack sufficient durability. The present disclosure may provide an insert and a cutting tool which are excellent in durability.

<Inserts>

Inserts in the present disclosure may be described in detail below with reference to the drawings. For the sake of description, the drawings referred to below may illustrate, in simplified form, only main members necessary for describing embodiments. Hence, the inserts may include any arbitrary structural member not illustrated in the drawings referred to. Dimensions of the members in each of the drawings may faithfully represent neither dimensions of actual structural members nor dimensional ratios of these members.

The insert 1 illustrated in FIGS. 1 to 5 may be an embodiment of indexable cutting inserts used by being attached to a predetermined position at a front end of a holder. The insert 1 may be rephrased as the cutting insert 1.

The insert 1 may include a base 3 composed of cemented carbide, cermet, or the like. The insert 1 may include the base 3 composed of a so-called cemented carbide including WC, and Co, Ni and Fe, each being a binding phase. The use of the base 3 may lead to excellent welding resistance against metal including Ti.

As used here, "WC" may denote WC particles. The WC particles may have, for example, a mean particle diameter of 0.5-1.5 μm. The base 3 may include 4-12 mass % of the binding phase. The base 3 may include only WC as a rest, besides the binding phase. The base 3 may include a hard phase including WC, and a binding phase including Co. In the present disclosure, a range, such as 4-12 mass %, may denote being a lower limit value or more and an upper limit value or less.

The insert 1 may have a polygonal plate shape, and may include a first surface 5 and a second surface 7 connecting to the first surface 5. If the first surface is viewed from above, the insert 1 may have a quadrangular shape. The insert 1 may also include a cutting edge 11 located on at least a part of a ridgeline 9 between the first surface 5 and the second surface 7. The first surface 5 may correspond to a rake surface 5, and the second surface 7 may correspond to a flank surface 7 in the non-limiting embodiment illustrated in FIG. 1. These may also be true for the following drawings. The first surface 5 may include a through hole 13 vertically penetrating the insert 1 in order to fix the insert 1 to the holder described later. The cutting edge 11 may be located on at least a part of the ridgeline 9 in the insert 1. Specifically, the cutting edge 11 may be located on portions corresponding to two sides, or may be located circularly on the whole of an outer peripheral part of the first surface 5.

The insert 1 may include a third surface 15 located on a side opposite to the first surface 5. In general, the first surface 5 may be called "an upper surface," the second surface 7 may be called "a lateral surface," and the third surface 15 may be called "a lower surface."

The insert 1 may include a convex part 17 located more inside the first surface 5 than the cutting edge 11. The convex part 17 is capable of controlling a flow direction of chips generated by the cutting edge 11. The convex part 17 is also capable of offering chip dividing effect. The convex part 17 may also be called a breaker protrusion.

Dimensions of the insert 1 are not particularly limited. For example, a length of one side of the first surface 5 may be set to approximately 5-20 mm, and a height from the first surface 5 to the third surface 15 may be set to approximately 3-20 mm.

The first surface 5 may include a groove 19. The groove 19 is servable as a flow path for a coolant. There may be one or a plurality of grooves 19.

The groove 19 may extend from a first end part **19*a* closest to the cutting edge 11 toward a second end part 19*b* farthest away from the cutting edge 11, at a position which is located away from the ridgeline 9 and is overlapped with the convex part 17. With this configuration, if the coolant is supplied toward the cutting edge 11, the groove 19 is servable as the flow path for the coolant, and the coolant is dischargeable from the groove 19. Additionally, the groove 19 may not connect to the ridgeline 9, and the cutting edge 11** may therefore be excellent in fracture resistance.

The groove 19 may be separated from the ridgeline 9 in a range of 40-700 μm away from the ridgeline 9. In other words, a distance between the groove 19 and the ridgeline 9 may be 40-700 μm. If the distance between the groove 19 and the ridgeline 9 is 40 μm or more, the cutting edge 11 may be less prone to fracture. If the distance between the groove 19 and the ridgeline 9 is 700 μm or less, the cooling effect on the cutting edge 11 may be enhanced, and it may also be easy to reduce cutting force.

The distance between the groove 19 and the ridgeline 9 may be 50-120 μm. With this configuration, the cutting edge 11 of the insert 1 may be less prone to fracture, and cutting force may be low. The distance between the groove 19 and the ridgeline 9 may be obtained by measuring the shortest distance between the groove 19 and the ridgeline 9.

The groove 19 may include an opening 21 located in the first surface 5, and a bottom surface 23. A range from an apex part 25 of the convex part 17 to the first end part **19*a* in the first surface 5 may be a breaker region 27. An imaginary straight line passing through a center of the first surface 5 and a center of the third surface 15 may be a central axis O of the insert 1. An imaginary plane which is orthogonal to the central axis O and is located between the first surface 5 and the third surface 15 may be a reference plane S. The bottom surface 23 may include an inclined portion 29 inclined so as to come closer to the reference plane S as going toward the first end part 19*a* in the breaker region 27**.

With this configuration, it is possible to vigorously drain the coolant along the inclined portion 29 in the breaker region 27, and therefore, chips may tend to be pushed out by the coolant. Consequently, it may become possible to enhance chip push-out effect (push-up effect) when the chips come into contact with the convex part 17.

For example, low carbon steels, such as SCr420 and S10C, may be prone to chip welding. If machining these workpieces, the insert 1 may be prone to fracture and chipping with the welding as a starting point. With the above configuration, the fracture and chipping of the insert 1 due to the welding is reducible by enhancing the chip push-out effect by the convex part 17 so as to reduce the chip welding. The insert 1 may therefore be excellent in durability, thus leading to a stable machining process over a long term.

If a workpiece is SCr420 as an embodiment of machining conditions, it is possible to set that a cutting speed (Vc) is 200 m/min, a feed speed (f) is 0.2 mm/rev, and a cut depth (ap) is 1.0 mm. If a workpiece is S10C, it is possible to set that Vc is 250 m/min, f is 0.2 mm/rev, and ap is 1.5 mm.

An inclination angle θ1 of the inclined portion 29 relative to the reference plane S is not limited to a specific value. For example, the inclination angle θ1 may be set to approximately 5-30°. An evaluation of the inclination angle θ1 may be made on the basis of an imaginary plane S' parallel to the reference plane S.

Figure 4:
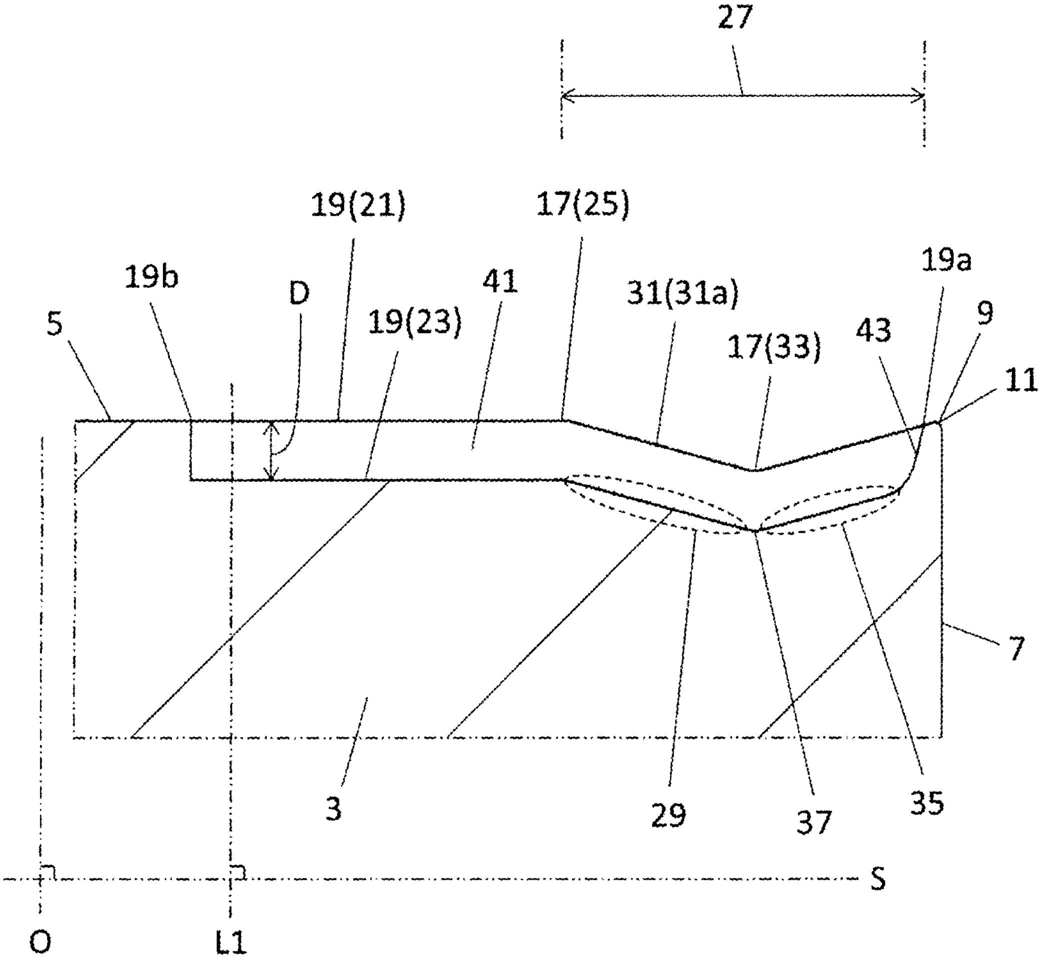
FIG. 4 is a sectional view taken along line IV-IV in the insert illustrated in FIG. 3.
Figure 5:
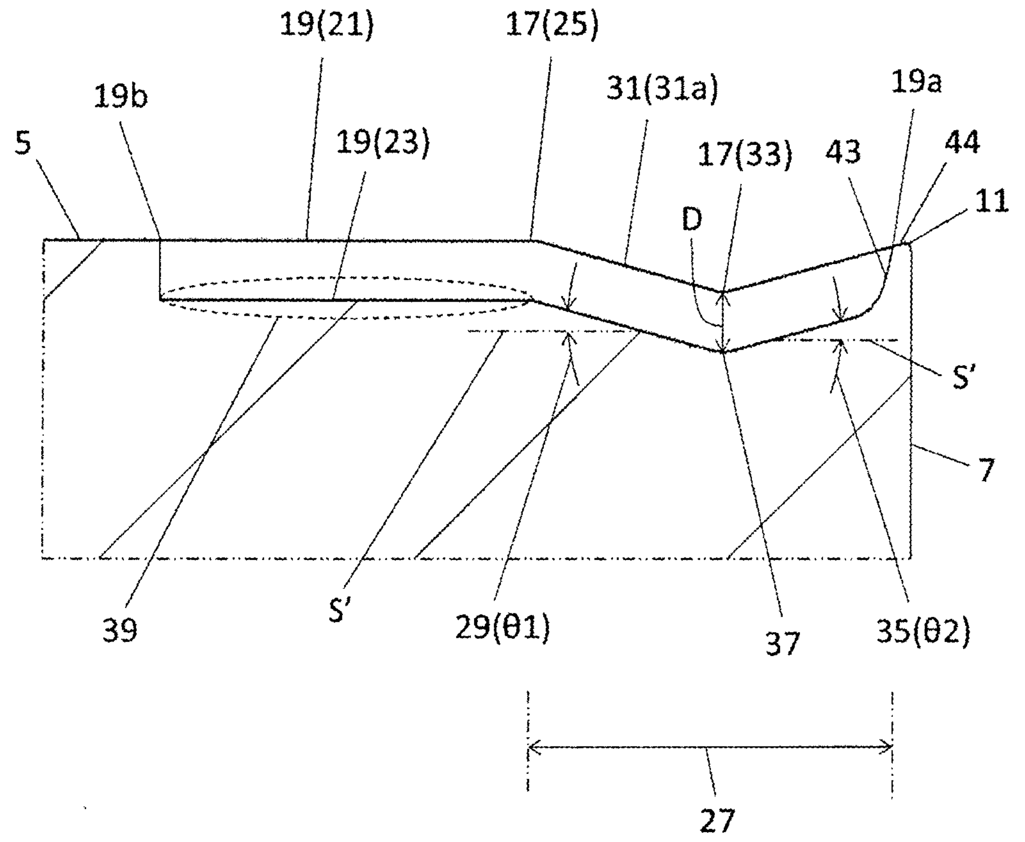
FIG. 5 is a sectional view being the same as FIG. 4.

As in the non-limiting embodiment illustrated in FIG. 4, the convex part 17 may include a wall part 31 inclined so as to come closer to the reference plane S as going from the apex part 25 toward the first end part **19*a* in a cross section along an extending direction of the groove 19. The inclined portion 29 may include a part inclined at the same angle as an outer edge 31*a* of the wall part 31 in the cross section along the extending direction of the groove 19. With this configuration, stable chip control is achievable by drawing chips into the groove. Additionally, because the inclined portion 29 has a shape along the convex part 17**, the chips may tend to be pushed out by the coolant.

As used here, the term "the same angle" may be approximately the same, and need not be strictly the same. Specifically, if a difference between angles compared with each other is within 15°, an evaluation may be made that the angles are approximately the same. As in the non-limiting embodiment illustrated in FIG. 4, the whole of the inclined portion 29 may be inclined at the same angle as the outer edge **31*a* of the wall part 31**.

A distance from the bottom surface 23 to the opening 21 may be a groove depth D. A width of the opening 21 in a direction orthogonal to the extending direction of the groove 19 may be an opening width W. A ratio of the groove depth D and the opening width W (groove depth D/opening width W) may be 0.2-5.0 in the inclined portion 29. If the value of the ratio is 0.2 or more, chips may be less likely to enter the groove 19. Therefore, the function as the flow path in the groove 19 can easily be maintained in the inclined portion 29. If the value of the ratio is 5.0 or less, the flow rate of the coolant may be less likely to decrease in the inclined portion 29. It may therefore be easy to enhance the chip push-out effect by the convex part 17. It may also be easy to maintain the cooling effect.

The groove depth D and the opening width W are not limited to a specific value. For example, the groove depth D may be set to approximately 40-700 μm. The opening width W may be set to approximately 40-700 μm. The groove depth D may be evaluated by a dimension between the bottom surface 23 and the opening 21 on an imaginary straight line L1 orthogonal to the reference plane S.

The groove 19 may include a region where the ratio (groove depth D/opening width W) increases as going from a side of the second end part **19*b* to a side of the first end part 19*a* in the breaker region 27. With this configuration, it may be easy to enhance the chip push-out effect by the convex part 17 while maintaining the function as the flow path for the coolant in the groove 19**. It may also be easy to enhance the cooling effect.

The inclined portion 29 may be located closer to the second end part 19*b* than a basal end part 33 on a side of the first end part 19*a* in the convex part 17. This configuration may contribute to enhancing the chip push-out effect when chips come into contact with the convex part 17. The basal end part 33 may denote a base part of the convex part 17.

The first end part 19*a* may be located closer to the cutting edge 11 than the basal end part 33 on the side of the first end part 19*a* in the convex part 17. With this configuration, the first end part 19*a* may be located near the cutting edge 11, and it is therefore possible to enhance the cooling effect in the vicinity of the cutting edge.

The bottom surface 23 may include an inclined portion 35 inclined so as to separate from the reference plane S as going toward the first end part 19*a* in the breaker region 27. If the bottom surface 23 includes the inclined portion 35, the inclined portion 29 may be rephrased as the first inclined portion 29, and the inclined portion 35 may be rephrased as the second inclined portion 35. The second inclined portion 35 may be located closer to the first end part 19*a* than the first inclined portion 29. This configuration may facilitate a vigorous discharge of the coolant from the groove 19. The second inclined portion 35 may be located closer to the cutting edge 11 than the basal end part 33 on the side of the first end part 19*a* in the convex part 17.

An inclination angle θ2 of the second inclined portion 35 relative to the reference plane S may be smaller than an inclination angle θ1 of the first inclined portion 29 relative to the reference plane S. This configuration may facilitate the vigorous discharge of the coolant from the groove 19. The inclination angle θ2 of the second inclined portion 35 relative to the reference plane S is not limited to a specific value. For example, the inclination angle θ2 may be set to 3-30°. Similarly to the inclination angle θ1, an evaluation of the inclination angle θ2 may be made on the basis of the imaginary plane S'.

A part 37 closest to the reference plane S in the bottom surface 23 may be located between the first inclined portion 29 and the second inclined portion 35. The bottom surface 23 may include a roundness whose radius R is 20-500 μm from the part 37 closest to the reference plane S in the bottom surface 23 to the second inclined portion 35. With this configuration, the flow of the coolant may be less likely to be blocked. The second inclined portion 35 may connect to the part 37 by interposing therebetween the roundness whose radius R is 20-500 μm. The first inclined portion 29 may directly connect to the part 37.

The bottom surface 23 may include a part 39 which is located closer to the second end part 19*b* than the first inclined portion 29, and is parallel to the reference plane S. The first inclined portion 29 may connect to the part 39. The groove 19 may also include an end surface connecting an end portion on a side of the second end part 19*b* in the part 39, and the second end part 19*b*. The end surface may be parallel to the central axis O. The second end part 19*b* is not limited to a structure connectable to the end surface. The second end part 19*b* may be opened by being communicated with a space, such as a concave part.

The groove 19 may include a sidewall surface 41 extending from the bottom surface 23 to the opening 21. A surface roughness of the sidewall surface 41 may be R1, and a surface roughness of the bottom surface 23 may be R2. R1 may be Ra 3.0 μm or less, and it may be R1>R2. With this configuration, a surface area on a side of the sidewall surface 41 may be increased to enhance the cooling effect, and turbulence may tend to occur due to different roughnesses.

A lower limit value of R1 may be Ra 0.5 μm. R2 may be set to approximately Ra 0.2-2.5 μm. The surface roughness may be evaluated by, for example, arithmetic average roughness (Ra). The arithmetic average roughness (Ra) may be measured according to, for example, JIS B 0601-2013.

The groove 19 may include a rising surface 43 which is located closer to the cutting edge 11 than the second inclined portion 35, and which is inclined relative to the second inclined portion 35. This configuration may facilitate the vigorous discharge of the coolant from the groove 19. The rising surface 43 may connect to the second inclined portion 35.

The first surface 5 may include a land surface 44 which is located closer to the cutting edge 11 than the rising surface 43, and which is inclined relative to the rising surface 43. The first end part 19*a* may be located on a boundary between the rising surface 43 and the land surface 44. The first end part 19*a* may include a roundness. If the first end part 19*a*, which corresponds to a ridgeline between the rising surface 43 and the land surface 44 inclined relative to the rising surface 43, includes the roundness, the coolant may tend to be discharged smoothly from the groove 19 to the cutting edge.

The roundness of the first end part 19*a* may be 20-100 μm in radius R. With this configuration, the flow of the coolant can be made smooth, and a stress concentration during outflow of chips can be relaxed to avoid chipping and fracture.

The first surface 5 may include a corner part 45. The convex part 17 may extend along a bisector of the corer part 45. The groove 19 may extend along the bisector of the corner part 45. The groove 19 may be located on the bisector of the corner part 45.

The insert 1 may include a breaker groove 47 located on the first surface 5 along the cutting edge 11. The breaker groove 47 may come closer to the reference plane S as going away from the cutting edge 11. If the insert 1 includes the breaker groove 47, at least a part of the convex part 17 may be located more inside the first surface 5 than the breaker groove 47.

For example, a coating layer including a TiCN layer and an $Al_2O_3$ layer may be disposed on a surface of the base 3 in the insert 1. The base 3 may be exposed on at least a region in the vicinity of the cutting edge 11 and the groove 19 on the first surface 5 in the insert 1. In other words, the coating layer need not be present on the surface of the base 3 in the vicinity of the cutting edge 11 and the groove 19 on the rake surface 5.

With this configuration, it is possible to avoid welding of a workpiece to the insert 1 even in the case of machining metal including, for example, titanium having high weldability. The above-mentioned region may be a region located within 0.5 mm from the cutting edge 11 and the groove 19. That is, the base 3 may be exposed in a region of the first surface 5 which falls within the range located within 0.5 mm from the cutting edge 11 and the groove 19 in the insert 1. The coating layer need not be present on the entire surface of the base 3.

A shape of the groove 19 (hereinafter also referred to as a cross-sectional shape of the groove 19) in a cross section orthogonal to the extending direction of the groove 19 may be a shape whose opening width W is larger than a width of the bottom surface 23. The cross-sectional shape of the groove 19 may be, for example, a semicircular shape, a triangular shape, or a trapezoidal shape.

The insert 1 including the groove 19 on the rake surface 5 may be obtained, for example, by manufacturing cemented carbide in the shape of the insert without the groove 19, and then by forming the groove 19 on the rake surface 5 so as to serve as the groove 19 in the insert 1 by using, for example, a drilling process or laser beam. The insert 1 is also obtainable by manufacturing a molded body with a concave part serving as the groove 19 after sintering, by using a mold with a convex part corresponding to the groove 19, followed by sintering the molded body.

The shape of the groove 19 is measurable with, for example, a shape analysis laser microscope. The shape may be measured with, for example, a VK-X1000 manufactured by KEYENCE CORPORATION. Measurement conditions may be the following conditions.

Measurement mode: Simple measurement
Scanning mode: Focus variation
Measurement size: Standard
Pitch: 4.50 μm
Brightness: 70
To enable noise region processing: ON
Coaxial vertical: 100
Ring illumination: OFF
Z-axis mode: Recommended setting
Z measurement distance fixing: OFF
Automatic upper and lower limits: ON
Head: R
Objective lens name: Plan
Objective lens magnification: 10×
NA: 0.3
WD: 16.5 mm
Brightness mode: Automatic
Brightness (automatic): 70
Brightness (manual): 2
Edge enhancement: 5

Next, inserts 1*a* to 1*c* of the present disclosure may be described below with reference to FIGS. 6 to 11. The following description of the inserts 1*a* to 1*c* may be focused mainly on differences from the insert 1, and a detailed description of configurations similar to those of the insert 1 may be omitted in some cases.

Figure 6:
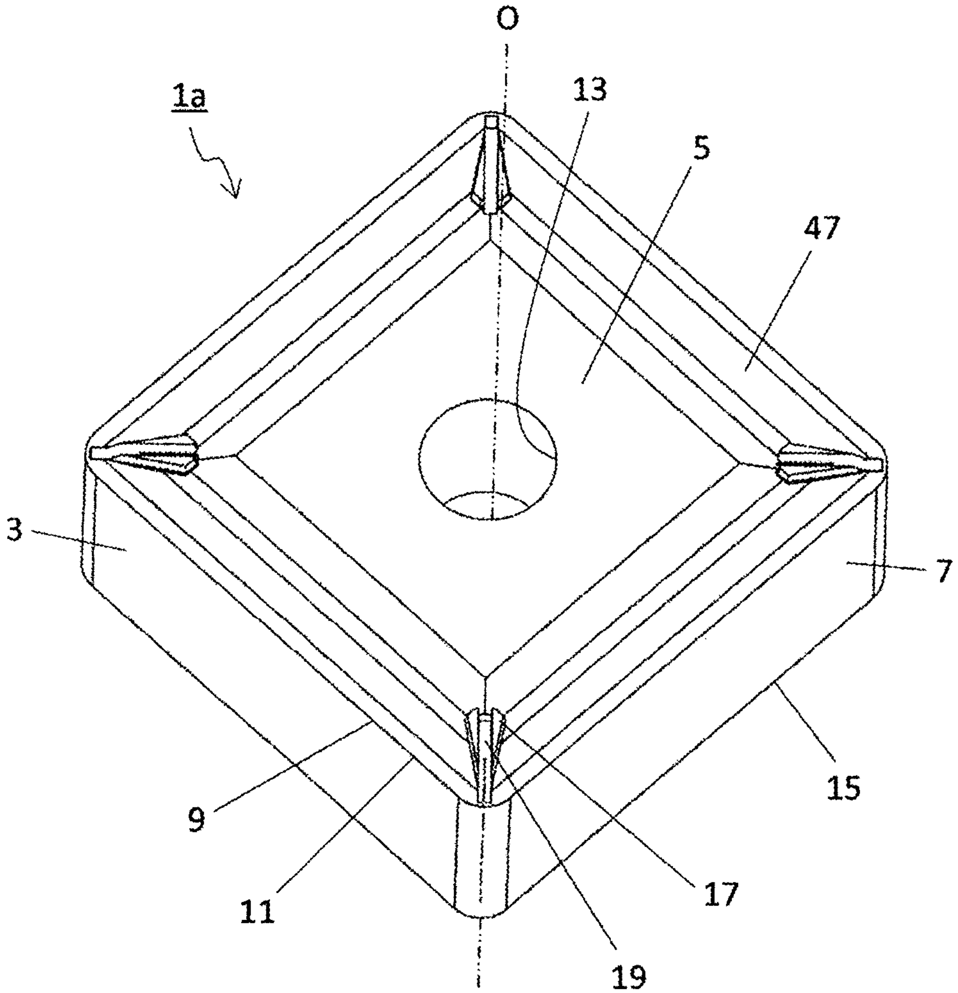
FIG. 6 is a perspective view illustrating an embodiment of inserts in the present disclosure.
Figure 7:
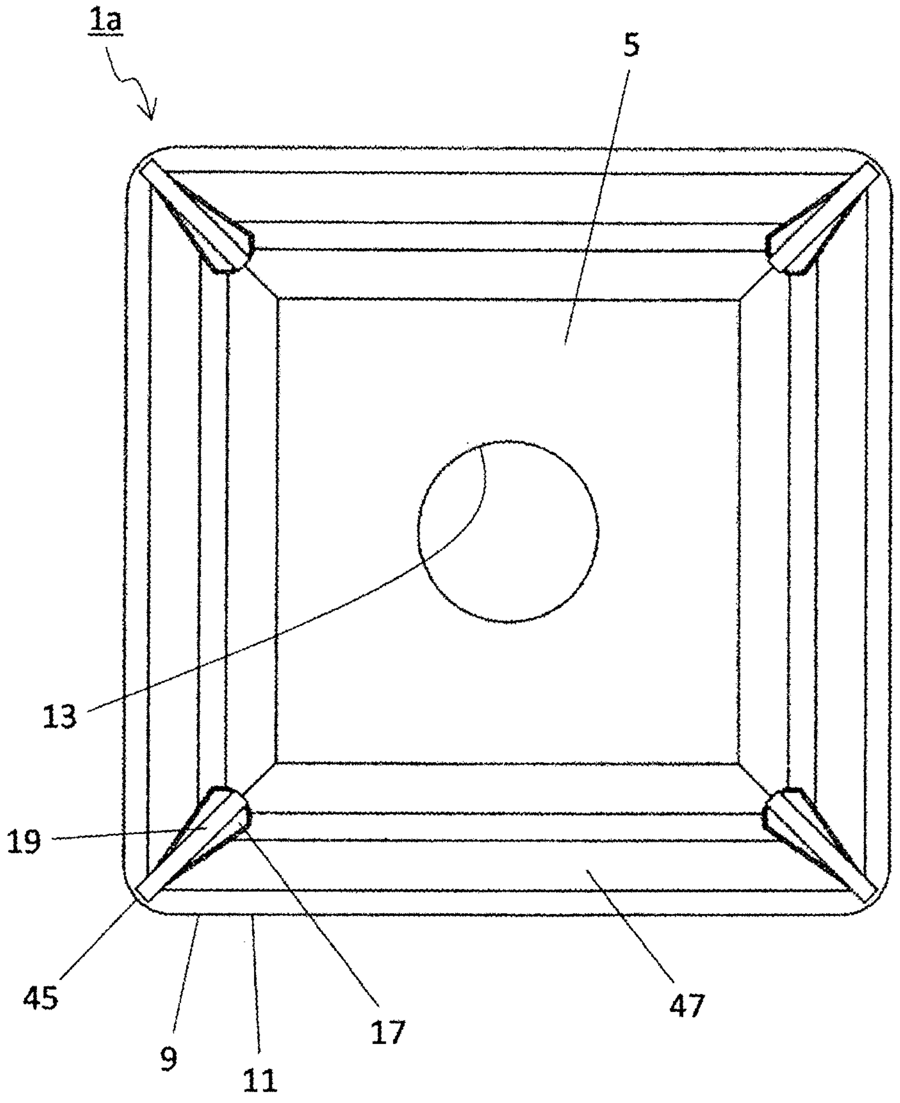
FIG. 7 is a plan view of the insert illustrated in FIG. 6.

The insert 1*a* may include a part which is flat, which is located more inside the first surface 5 than the convex part 17, and which is located further away from the reference plane S than the convex part 17 as in the non-limiting embodiment illustrated in FIGS. 6 and 7.

Figure 8:
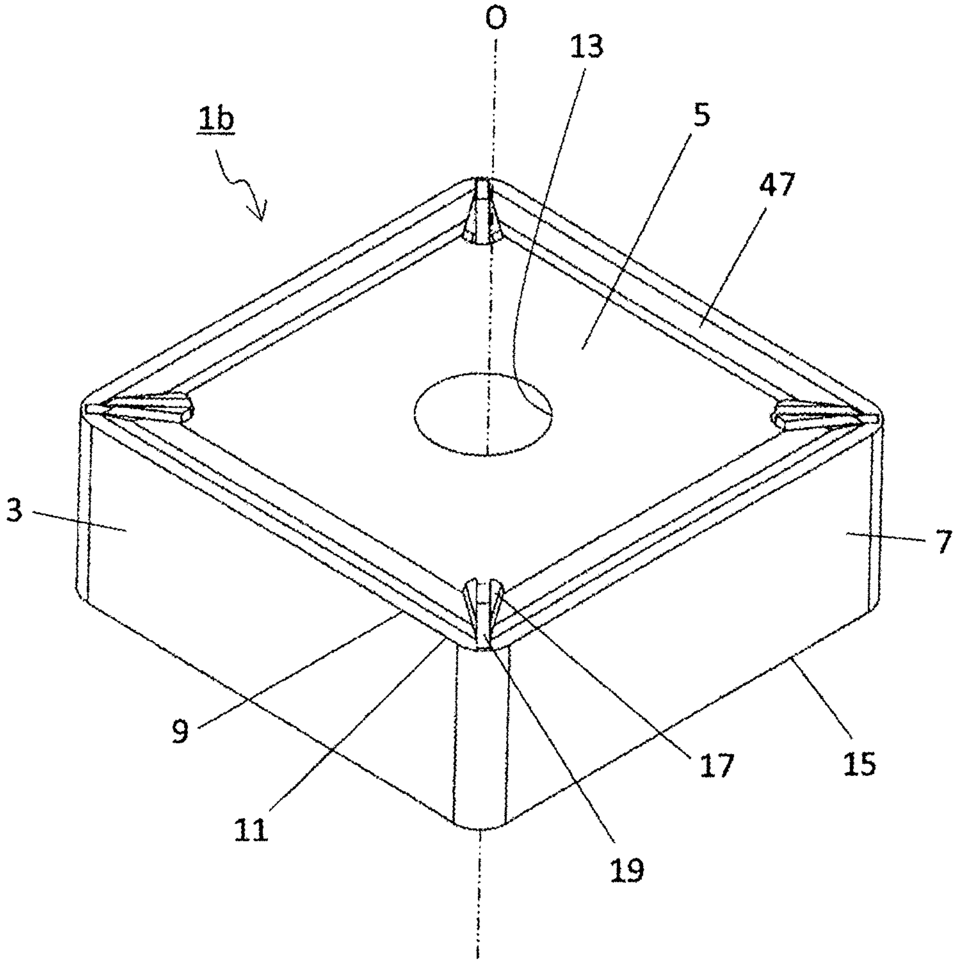
FIG. 8 is a perspective view illustrating an embodiment of inserts in the present disclosure.
Figure 9:
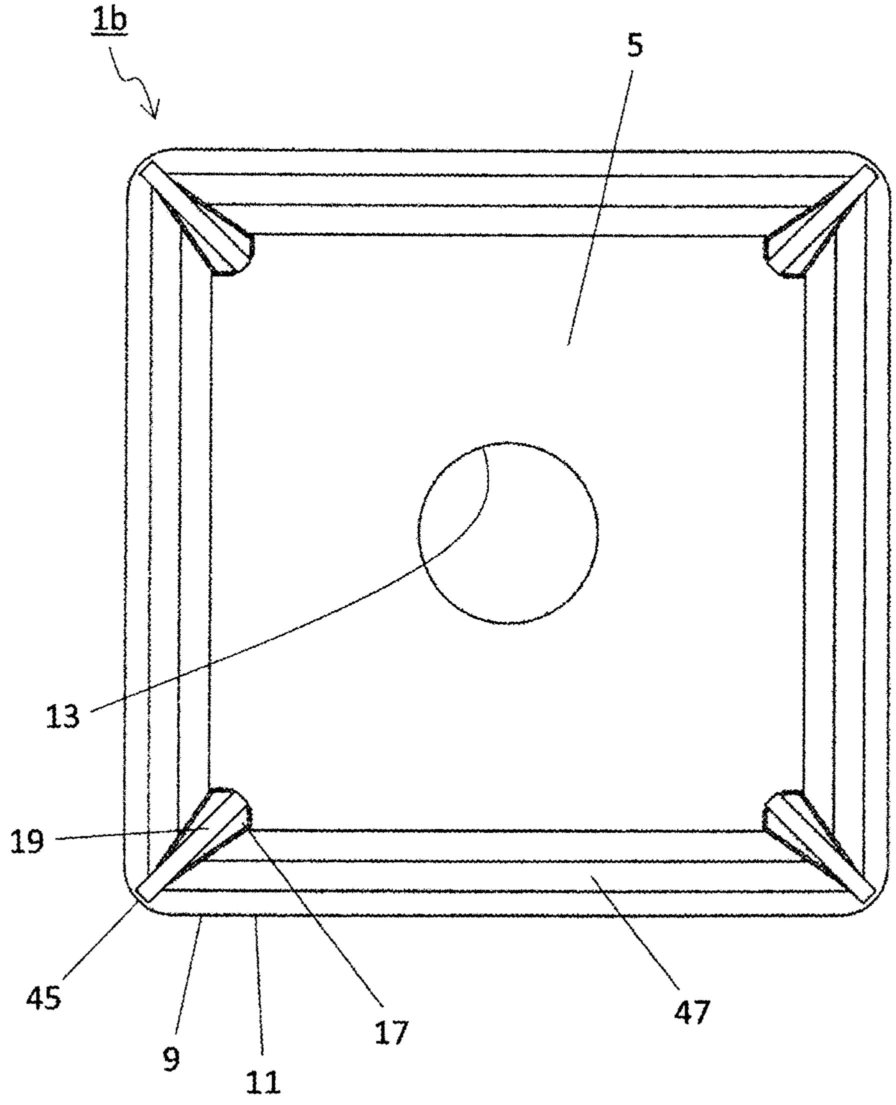
FIG. 9 is a plan view of the insert illustrated in FIG. 8.

The convex part 17 in the insert 1*b* may have a shape as in the non-limiting embodiment illustrated in FIGS. 8 and 9.

Figure 10:
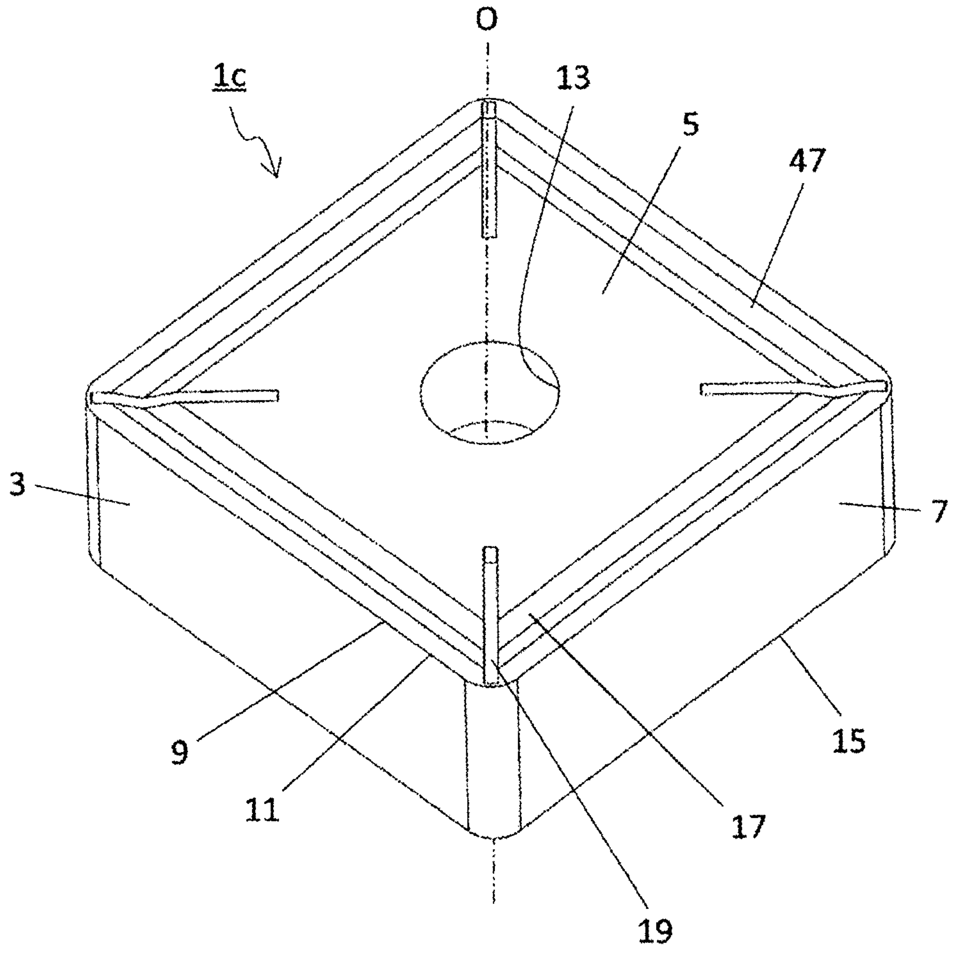
FIG. 10 is a perspective view illustrating an embodiment of inserts in the present disclosure.
Figure 11:
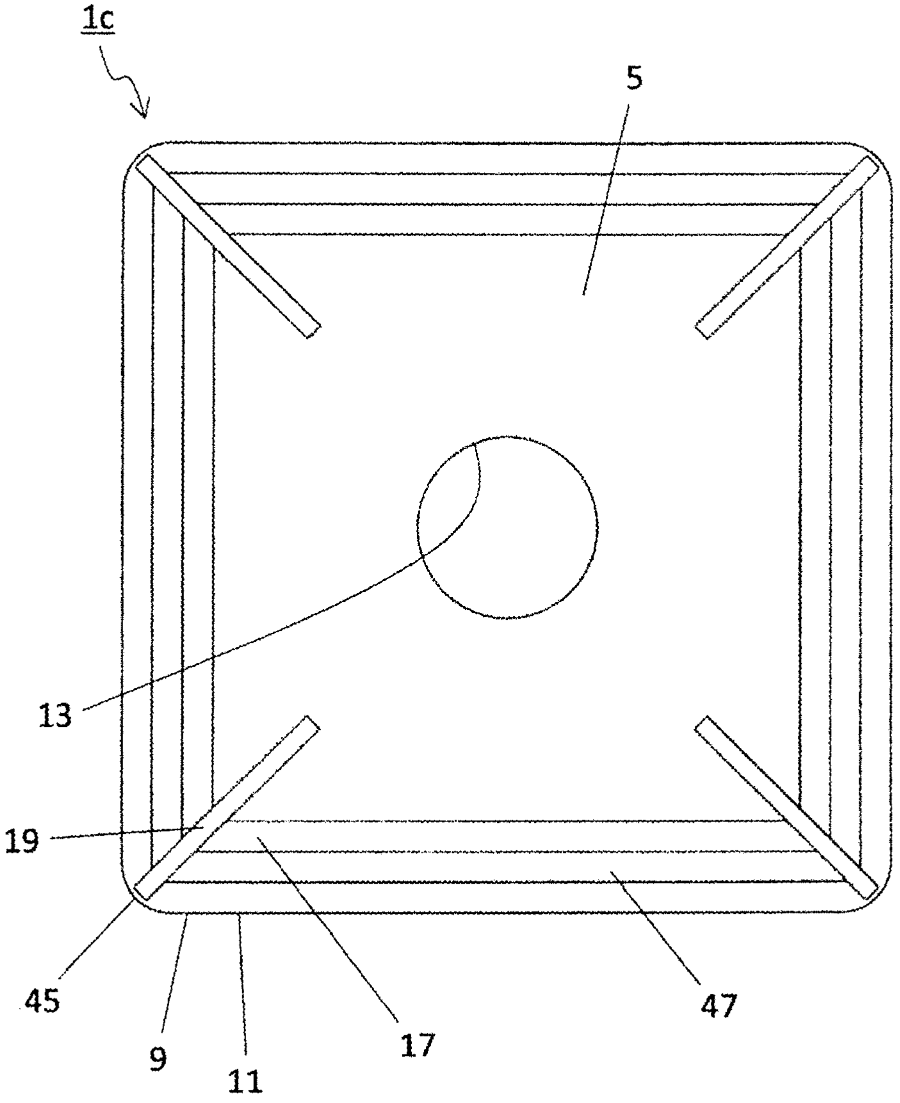
FIG. 11 is a plan view of the insert illustrated in FIG. 10.

The convex part 17 in the insert 1*c* may be located circularly along an outer peripheral part of the first surface 5 as in the non-limiting embodiment illustrated in FIGS. 10 and 11.

<Cutting Tools>

Cutting tools of the present disclosure may be described below with reference to the drawings.

The cutting tool 101 may include a holder 105 which has a length from a first end 105*a* (an upper end in FIG. 12) to a second end 105*b* (a lower end in FIG. 12), and which includes a pocket 103 located on a side of the first end 105*a*, and the above-mentioned insert 1 located in the pocket 103. If the cutting tool 101 includes the insert 1, the cutting tool 101 may have excellent durability and is therefore capable of achieving a stable machining process over a long term. The convex part 17 and the groove 19 and the like may be omitted in FIG. 12, and FIG. 12 may illustrate the case where the first surface 5 has a rhombus shape in a plan view. These points may also be true for FIG. 13 described later.

The holder 105 may be a bar-shaped body extending from the first end 105*a* to the second end 105*b*. In general, the first end 105*a* may be called "a front end", and the second end 105*b* may be called "a rear end." A length from the first end 105*a* to the second end 105*b* is not limited to a specific value. For example, the length from the first end 105*a* to the second end 105*b* may be set to approximately 100-250 mm.

The pocket 103 may be a part to which the insert 1 is attached. The pocket 103 may include a seating surface parallel to a lower surface of the holder 105, and a constraining lateral surface vertical or inclined relative to the seating surface. The pocket 103 may open on a side of the first end 105*a* of the holder 105.

The insert 1 may be located in the pocket 103. The lower surface of the insert 1 may be directly in contact with the pocket 103. Alternatively, a sheet may be held between the insert 1 and the pocket 103.

The insert 1 may be attached to the holder 105 so that at least a part of a portion used as the cutting edge 11 on the ridgeline 9 where the first surface 5 being the rake surface 5 intersects with the second surface 7 being the flank surface 7 can protrude outward from the holder 105. The insert 1 may be attached to the holder 105 by a screw 107. Specifically, the insert 1 may be attached to the holder 105 by inserting the screw 107 into a through hole 13 of the insert 1, and by inserting a front end of the screw 107 into a screw hole formed in the pocket 103 so as to engage screw parts each other.

The cutting tool 101 may include a hose whose front end includes a nozzle in order to supply a coolant to the cutting edge 11. A pump for supplying the coolant may connect to the hose.

Figure 13:
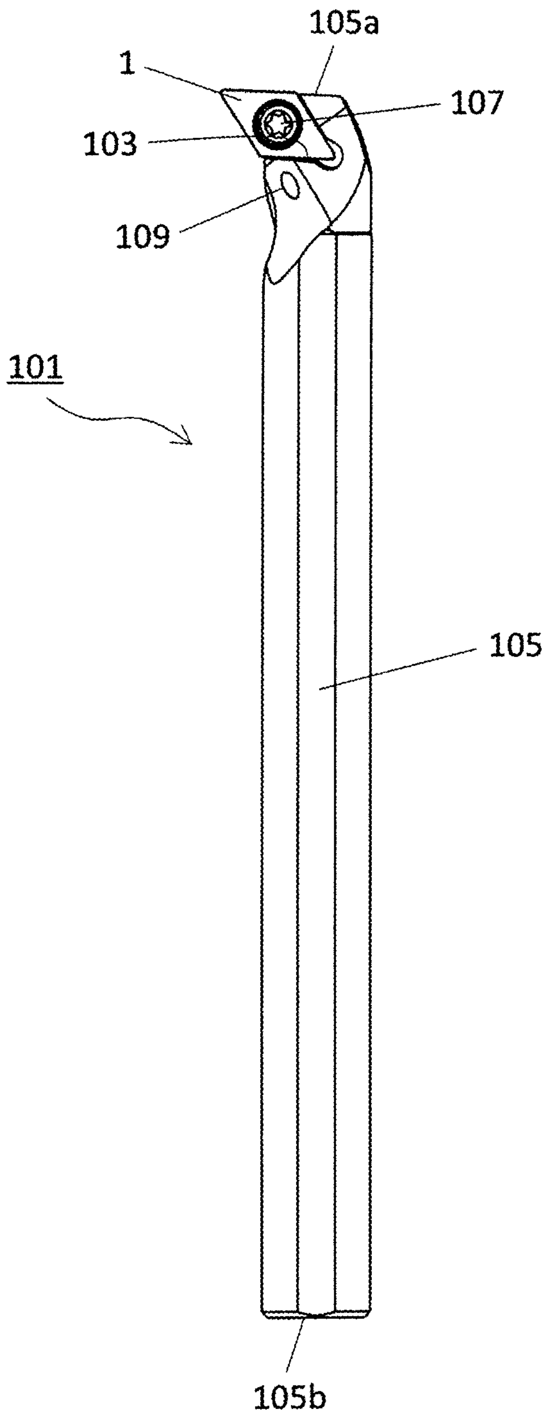
FIG. 13 is a plan view illustrating an embodiment of cutting tools in the present disclosure.

The holder 105 may include a nozzle 109 for supplying the coolant to the cutting edge 11 in the cutting tool 101 as in the non-limiting embodiment illustrated in FIG. 13. A spout of the nozzle 109 located near the insert 1 may facilitate the supply of the coolant to the cutting edge 11. The nozzle 109 may be fixed to a part of the holder 105. Alternatively, the holder 105 may include a hole so as to be used as the nozzle 109 as in the non-limiting embodiment illustrated in FIG. 13. The coolant discharged from the nozzle 109 may be, for example, an aqueous coolant or oil-based coolant.

The nozzle 109 may connect to a pump, and may discharge the coolant at a pressure of 0.5-20 MPa. A higher-speed machining is achievable at a pressure of 10 MPa or more.

The holder 105 may include a flow path through which the coolant flows. For example, steel and cast iron are usable as a material of the holder 105. Of these materials, steel having enhanced toughness may be used.

Figure 12:
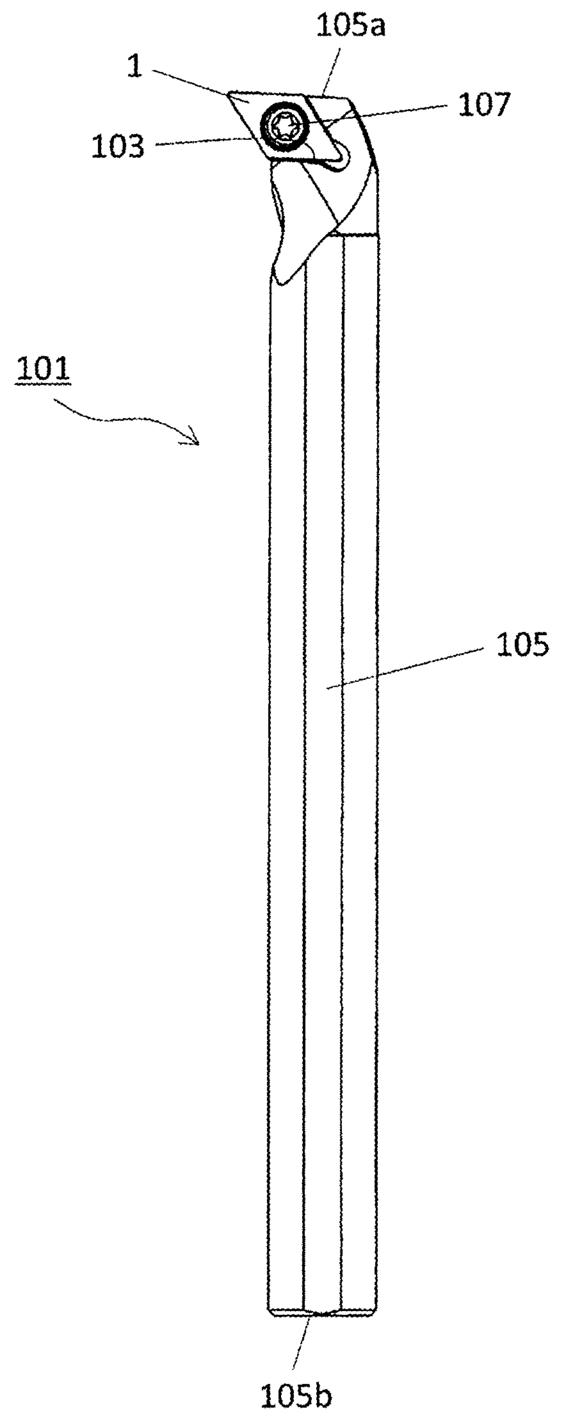
FIG. 12 is a plan view illustrating an embodiment of cutting tools in the present disclosure.

The cutting tool 101 for use in a so-called turning process may be illustrated in the non-limiting embodiments illustrated in FIGS. 12 and 13. Examples of the turning process may include internal process, external process and grooving process. The cutting tool is not limited to ones which are used for the turning process. For example, the insert 1 may be applied to a cutting tool used for a milling process.

Although the cutting tool 101 includes the insert 1 in the non-limiting embodiments illustrated in FIGS. 12 and 13, it is not intended to limit to these embodiments. For example, the cutting tool 101 may include any one of the inserts 1*a* to 1*c*.

The inserts and the cutting tools using the inserts are not limited to the above embodiments, and various improvements and changes may be made without departing from the gist of the present disclosure.

The invention claimed is:

1. An insert, comprising:

a first surface having a corner part;

a second surface connecting to the first surface;

a third surface located on a side opposite to the first surface;

a cutting edge located on at least a part of a ridgeline between the first surface and the second surface; and a convex part located more inside the first surface than the cutting edge and elongated along a bisector of the corner part, wherein the first surface comprises, at a position which is located away from the ridgeline and overlaps the convex part, a groove elongated along the bisector of the corner part from a first end part closest to the cutting edge to a second end part farthest away from the cutting edge, the groove comprises an opening located in the first surface, a bottom surface, and a sidewall surface extending from the bottom surface to the opening, a surface roughness of the sidewall surface being greater than a surface roughness of the bottom surface, a range from an apex part of the convex part to the first end part in the first surface is a breaker region, an imaginary straight line passing through a center of the first surface and a center of the third surface is a central axis, and an imaginary plane which is orthogonal to the central axis and is located between the first surface and the third surface is a reference plane, and the bottom surface comprises an inclined portion inclined so as to come closer to the reference plane as going toward the first end part in the breaker region.

2. The insert according to claim 1, wherein, in a cross section along an extending direction of the groove, the convex part comprises a wall part inclined so as to come closer to the reference plane as going from the apex part toward the first end part, and the inclined portion comprises a part inclined at a same angle as an outer edge of the wall part.

3. The insert according to claim 1, wherein, a distance from the bottom surface to the opening is a groove depth, and a width of the opening in a direction orthogonal to an extending direction of the groove is an opening width, the groove being elongated in the extending direction, and a ratio of the groove depth to the opening width is 0.2 to 5.0 in the inclined portion.

4. The insert according to claim 1, wherein, a distance from the bottom surface to the opening is a groove depth, and a width of the opening in a direction orthogonal to an extending direction of the groove is an opening width, the groove being elongated in the extending direction, and the groove comprises a region where a ratio of the groove depth to the opening width increases as going from a side of the second end part to a side of the first end part in the breaker region.

5. The insert according to claim 1, wherein the inclined portion is located closer to the second end part than a basal end part on a side of the first end part in the convex part.

6. The insert according to claim 1, wherein the first end part is located closer to the cutting edge than a basal end part on a side of the first end part in the convex part.

7. The insert according to claim 1, wherein the groove is located on the bisector of the corner part.

8. The insert according to claim 1, further comprising a breaker groove located on the first surface along the cutting edge.

9. The insert according to claim 8, wherein at least a part of the convex part is located more inside the first surface than the breaker groove.

10. The insert according to claim 1, wherein the bottom surface further comprises a second inclined portion located between the first end part and the inclined portion, and the second inclined portion is inclined so as to separate from the reference plane as going toward the first end part in the breaker region.

11. The insert according to claim 10, wherein an inclination angle of the second inclined portion relative to the reference plane is smaller than an inclination angle of the inclined portion relative to the reference plane.

12. A cutting tool, comprising:

a holder which has a length extending from a first end to a second end, and which comprises a pocket located on a side of the first end; and an insert located in the pocket, the insert comprising:

a first surface having a corner part;

a second surface connecting to the first surface;

a third surface located on a side opposite to the first surface;

a cutting edge located on at least a part of a ridgeline between the first surface and the second surface; and a convex part located more inside the first surface than the cutting edge and elongated along a bisector of the corner part, wherein the first surface comprises, at a position which is located away from the ridgeline and overlaps the convex part, a groove elongated along the bisector of the corner part from a first end part closest to the cutting edge to a second end part farthest away from the cutting edge, the groove comprises an opening located in the first surface, a bottom surface, and a sidewall surface extending from the bottom surface to the opening, a surface roughness of the sidewall surface being greater than a surface roughness of the bottom surface, a range from an apex part of the convex part to the first end part in the first surface is a breaker region, an imaginary straight line passing through a center of the first surface and a center of the third surface is a central axis, and an imaginary plane which is orthogonal to the central axis and is located between the first surface and the third surface is a reference plane, and the bottom surface comprises an inclined portion inclined so as to come closer to the reference plane as going toward the first end part in the breaker region.

13. The cutting tool according to claim 12, wherein the holder comprises a flow path configured to allow a coolant to flow through.

* * * * *